Patented Nov. 26, 1940

2,222,874

UNITED STATES PATENT OFFICE 2,222,874

DEHYDRATED STARCH

Gerald John Leuck, Evanston, Ill., assignor to Corn Products Refining Company, New York, N. Y., a corporation of New Jersey No Drawing. Application November 25, 1938, Serial No. 242,286

2 Claims. (Cl. 127—71)

This invention relates to a dehydrating treatment of starch whereby the starch has certain characteristic properties, for example, the capacity for forming a compound with formaldehyde which when set or solidified will be adhesive, cohesive, and substantially water insoluble, a characteristic not possessed by starch when dried to zero moisture content, as measured by the ordinary means for determining the moisture content of starches.

By the word "starch", when used herein without qualification, is meant, not only raw starch or starch-containing material, but also starch derivatives or hydrolysis products, of the series from gelatinized starch to the highly soluble dextrines but not including sugars; and the starches, so defined, which may be treated in accordance with this invention comprise all the common starches such as corn, potato, wheat, rice, and tapioca starches. For example, the starch treated may be a commercial raw or low fluidity starch, a thin boiling or high fluidity starch, a dextrine, a British gum, or a gelatinized starch such as described in United States patent to Fred O. Giesecke, No. 1,979,257, granted November 6, 1934. Gelatinized starch is used preferably because the disruption of the starch cells facilitates removal of adsorbed and combined water.

The treatment of the starch in accordance with this invention is referred to as "dehydration." This term, however, is to be distinguished from ordinary water removing procedures which are sometimes, perhaps, more commonly included under the term "dehydration", but which remove neither adsorbed water nor, to any considerable extent, water combined with the starch to form starch hydrate; the common drying processes involving, generally speaking, only the removal of water absorbed in the starch, and where a zero determination results from such drying treatment that does not indicate the removal of all water from the starch as contemplated by the present invention. The evidence of this is that when starch is dehydrated in the sense of the present invention, it has properties radically different from the properties possessed by starches dried to zero water content by common drying methods and as calculated by usual moisture determinations. The dehydration of the present invention is accomplished by subjecting the starch to long contact with dry air at elevated temperature, or to protracted treatment under a vacuum, or to contact with carbon dioxide or alcoholic or other organic vapor having a moisture removing effect, until all of the absorbed water is removed and also the adsorbed films of water as well as the water combined with the starch molecule to form starch hydrate; the result being that more water is removed from the starch than is removed by drying methods heretofore used in which moisture content is reduced to zero.

This application is a division of co-pending application of Gerald John Leuck, filed December 10, 1937, Serial No. 179,121. No claim is made herein to the starch compound formed by reacting dehydrated starch, in accordance with the above definition, with formaldehyde, as that compound is claimed in said application Serial No. 179,121.

The invention herein claimed will be illustrated in the following specific examples which, however, are to be considered as typical and informative merely and not as limiting the invention to the particular procedures described; the intention being to cover all equivalents as well as all modifications within the scope of the appended claims.

Example 1

Gelatinized or cold water pasting starch made, for example, by passing moist raw starch between heated rolls as described in United States Patent No. 1,979,257, referred to above, is spread out on trays in layers of one-quarter of an inch thick. The trays are placed in a dehydrating cabinet. The temperature of the interior of the cabinet is raised to about 275° F. in the course of three hours and this temperature is then maintained for 20 hours. During the entire treatment in the cabinet the layers of starch are subjected to a low current of nearly dry air, for example, air which has a relative humidity of 10% to 20% at 70° F. This procedure will remove from the starch more moisture than it is necessary to remove in order that the starch, when tested by the tests ordinarily used for moisture determination in starch, will show a total absence of moisture, in fact less than zero moisture measured by ordinary tests for determining moisture in starch. Unless the dehydrated product is to be used immediately, it should be enclosed for cooling, or, if desired, for storage, and while still hot, in containers which are sufficiently tight to substantially prevent contact of the product with atmospheric moisture. If the product is not soon to be used, the containers should be kept in an atmosphere which is as dry as practicable and preferably at a temperature below 75° F. in order to insure against deterioration due to the influence of atmospheric moisture.

Example 2

Gelatinized starch of the kind described in Example 1 is subjected in one-quarter inch thick layers to a 29 to 30 inch vacuum for 24 hours. During the first four hours of this time the temperature is gradually elevated to approximately 284° F. and this temperature is maintained for the remaining 20 hours.

Example 3

Gelatinized starch of the kind described in Example 1 is dried to substantially constant weight at 212° F. in an ordinary tray oven dryer. The dried product is then placed in a horizontal cylinder which is closed except for a gas aperture at each end. The temperature of the material in the cylinder is gradually elevated so that it reaches a maximum of approximately 284° F. in the course of 3 hours. This temperature is maintained for 20 additional hours and the cylinder and contents are then cooled. During the entire time the starch is in the cylinder, carbon dioxide gas is passed through the cylinder at the rate of 1 part by weight of the gas per hour to 100 parts of starch, and the cylinder is continuously revolved so as to effect the mixing of the gas with the starch.

Example 4

The procedure is the same as in Example 3 except that the carbon dioxide gas is bubbled through substantially dry methanol before it is passed through the dehydrating cylinder.

Example 5

The dehydration procedure is the same as in Example 3 but an ordinary dextrine, for example, dextrine which is almost completely water soluble is used instead of the cold water pasting starch.

Example 6

The procedure is the same as in Example 4 except that powdered raw starch is used instead of the cold water pasting starch.

It is desirable to heat the starch to temperatures of about 275°–284° F. which are sub-dextrinizing temperatures. If the starch is heated at temperatures much below these, there is difficulty in removing the adsorbed and combined water, at least within a period of time to make the process practical. If the starch is heated much above these temperatures, there is danger that degeneration will take place.

Dehydration methods other than those described above may be employed. The essential thing is that the extraction of moisture should be carried to such a point that not only all absorbed water is removed, but also other moisture which is not in the starch as free moisture and is not removable by ordinary drying methods, but which is so combined with or attached to the starch as to be incapable of being removed by such ordinary drying methods. The utility of the invention is based upon the discovery that the removal of this non-free moisture from the starch gives it characteristics which the starch would not otherwise possess.

I claim:

1. Starch dehydrated in the sense that substantially all absorbed water together with adsorbed water and water combined with the starch as starch hydrate has been removed, characterized by the capacity to form with formaldehyde a cohesive and adhesive plastic which is substantially water insoluble.

2. Gelatinized starch dehydrated in the sense that substantially all absorbed water has been removed therefrom together with water adsorbed or combined with the starch as starch hydrate, the dehydrated product characterized by capacity to form with formaldehyde a compound which when solidified is adhesive, cohesive and substantially water insoluble.

GERALD JOHN LEUCK.